US008858131B2

(12) United States Patent
Scheicher

(10) Patent No.: US 8,858,131 B2
(45) Date of Patent: Oct. 14, 2014

(54) INSERT DESIGN FEATURE FOR SIDE PRESSING TECHNOLOGY

(71) Applicant: Kennametal Inc., Latrobe, PA (US)

(72) Inventor: Sebastian Scheicher, Fuerth (DE)

(73) Assignee: Kennametal Inc., Latrobe, PA (US)

( * ) Notice: Subject to any disclaimer, the term of this patent is extended or adjusted under 35 U.S.C. 154(b) by 127 days.

(21) Appl. No.: 13/655,547

(22) Filed: Oct. 19, 2012

(65) Prior Publication Data

US 2013/0108383 A1 May 2, 2013

(30) Foreign Application Priority Data

Oct. 26, 2011 (DE) .......................... 10 2011 116 942

(51) Int. Cl.
B23C 5/16 (2006.01)
B23B 27/14 (2006.01)
B22F 3/03 (2006.01)
B23C 5/22 (2006.01)

(52) U.S. Cl.
CPC ............. *B22F 3/03* (2013.01); *B23B 2200/125* (2013.01); *B23B 27/145* (2013.01); *B23B 2200/0419* (2013.01)
USPC ......................................... 407/113; 407/114

(58) Field of Classification Search
CPC ............ B23C 5/2213; B23C 2200/085; B23C 2200/125; B23C 2200/205; B23C 2200/323
USPC .................................... 407/113, 114, 115, 116
See application file for complete search history.

(56) References Cited

U.S. PATENT DOCUMENTS

| 4,294,565 | A | * | 10/1981 | Erkfritz | 407/113 |
| 4,681,488 | A | * | 7/1987 | Markusson | 407/114 |
| 5,720,583 | A | * | 2/1998 | Bohnet et al. | 407/42 |
| 5,951,214 | A | * | 9/1999 | Rothballer et al. | 407/42 |
| 6,712,563 | B2 | * | 3/2004 | Maier | 407/113 |
| 7,070,363 | B2 | * | 7/2006 | Long, II et al. | 407/113 |
| 7,104,735 | B2 | * | 9/2006 | Johnson et al. | 407/42 |
| 7,252,461 | B2 | * | 8/2007 | Karonen | 407/113 |
| 8,096,735 | B2 | * | 1/2012 | Sladek et al. | 407/114 |
| 8,454,279 | B2 | * | 6/2013 | Dufour et al. | 407/113 |
| 8,523,498 | B2 | * | 9/2013 | Uno et al. | 407/42 |
| 2013/0004251 | A1 | * | 1/2013 | Hausmann et al. | 407/42 |
| 2013/0022423 | A1 | * | 1/2013 | Ramesh | 408/200 |
| 2013/0039798 | A1 | * | 2/2013 | Satran et al. | 419/38 |

FOREIGN PATENT DOCUMENTS

DE 695 18 417 T2 5/1995
EP 0 962 272 A1 8/1999

* cited by examiner

*Primary Examiner* — Will Fridie, Jr.
(74) *Attorney, Agent, or Firm* — Larry R. Meenan, Esq.

(57) ABSTRACT

The invention relates to an indexable cutting insert having two faces, having a passage opening which extends from one face to the other, having a plurality of cutting corners which each have, toward the face, a continuously curved cutting edge, and a plurality of flanks which are arranged in pairs on one side and on the other side of the cutting corners. One cutting edge has a positive clearance angle and the other has a negative clearance angle. Each cutting corner is formed by two partial surfaces which adjoin one another along a line running parallel to the central axis of the passage opening.

6 Claims, 3 Drawing Sheets

US 8,858,131 B2

INSERT DESIGN FEATURE FOR SIDE PRESSING TECHNOLOGY

CLAIM TO PRIORITY

This application is a National entry application of German Application No. 102011116942.7, filed Oct. 26, 2011, the entire contents of which is incorporated herein by reference.

BACKGROUND OF THE INVENTION

The invention relates to an indexable cutting insert which can be used for material-removing machining. The invention relates in particular to an indexable cutting insert which is of substantially polygonal shape in plan view and which, in a preferred embodiment, is of generally triangular shape.

FIG. 1 shows a known indexable cutting insert 10 which, as seen in plan view, has a generally triangular body with three cutting corners 12. Extending centrally through the indexable cutting insert is a passage opening 14 which serves for the fastening of the indexable cutting insert to a tool holder. The passage opening 14 is surrounded on both sides, which face away from one another, of the indexable cutting insert 10 by in each case one face 16, only the upper of which is visible in FIG. 1. A cutting edge 18, 20, 22 is formed at least in portions at the transition between the face 16 and a circumferential surface of the indexable cutting insert 10.

Of the cutting edges, the cutting edge 20 which is continuously curved is situated in the region of the cutting corners 12. The curved cutting edge 20 is adjoined on one side by the cutting edge 18 and on the other side by the cutting edge 22. These are both substantially straight. The two cutting edges 18, 22 are assigned flanks 24, 26. Said flanks extend in a plane which is oblique with respect to the central axis of the passage opening 14. In relation to the cutting edges 18 and 22 which are situated on one side and on the other side of the curved cutting edge 20 arranged at the front and on the right in FIG. 1, the flank 24 constitutes a negative flank, whereas the flank 26 is a positive flank. In other words, the flank 24 is inclined such that its top edge is at a smaller distance than its bottom edge from the central axis of the passage opening 14. This is reversed in the case of the flank 26.

For the curved cutting edge 20' which is assigned to the face 16 not visible in FIG. 1, the angle of inclination of the flanks 24, 26 is exactly reversed: the flank 24 is a positive flank, and the flank 26 is a negative flank.

As a result of said arrangement of the flanks, the indexable cutting insert shown has six identical cutting geometries, specifically three on the "top side" of the cutting corners 12 and three on the "bottom side" of the cutting corners 12.

Between the curved cutting edges 20, 20' which are arranged at one cutting corner 12 there extends a curved surface 28, the radius of curvature of which corresponds to the radius of curvature of the cutting edges 20, 20'. Owing to the differently inclined flanks 24, 26, the curved cutting edges 20, 20' are offset with respect to one another if the central axis of the passage opening 14 is taken as a reference line. Therefore, in the exemplary embodiment shown in FIG. 1, the curved corner surface 28 runs not in the vertical direction but rather slightly obliquely from top right to bottom left. As a result, the main body of the indexable cutting insert cannot be produced in a single-piece press mold by uniaxial pressing. Even if use is made of slides which press in the radial direction against the circumferential surfaces of the main body of the indexable cutting insert where the flank 24 is generated, the main body cannot be removed from the mold owing to the oblique alignment of the corner surfaces 28.

SUMMARY OF THE INVENTION

It is the object of the invention to refine the known indexable cutting insert such that it can be removed from a press tool which uses lateral slides in the region of the flanks.

To achieve said object, according to the invention, there is provided an indexable cutting insert having two faces, having a passage opening which extends from one face to the other, having a plurality of cutting corners which each have, toward the face, a continuously curved cutting edge, and a plurality of flanks which are arranged in pairs on one side and on the other side of the cutting corners, wherein one has a positive clearance angle and the other has a negative clearance angle, characterized in that each cutting corner has two partial surfaces which adjoin one another along a line running parallel to the central axis of the passage opening. The invention departs from the previous notion that a continuous corner surface, and thus a continuous surface transition, should be used in the region of the cutting corners. In this way, the foundations were laid for the corner surface to be divided into two partial surfaces which meet at an obtuse angle. The transition from one to the other partial surface is now configured such that the two partial surfaces meet along a line extending parallel to the central axis of the passage opening and thus in the direction of removal from the mold. Said configuration makes it possible for the main body of the indexable cutting insert to be removed from a press tool.

The "kink" between the two partial surfaces does not impair the function of the corner surface of the indexable cutting insert, because said kink is present only between the two cutting edges. At the cutting edges themselves, the two partial surfaces merge continuously into one another, such that a continuous cutting edge is ensured.

BRIEF DESCRIPTION OF THE DRAWINGS

The invention will be described below on the basis of a preferred embodiment which is illustrated in the appended drawings, in which.

DETAILED DESCRIPTION OF THE INVENTION

Figure 1:
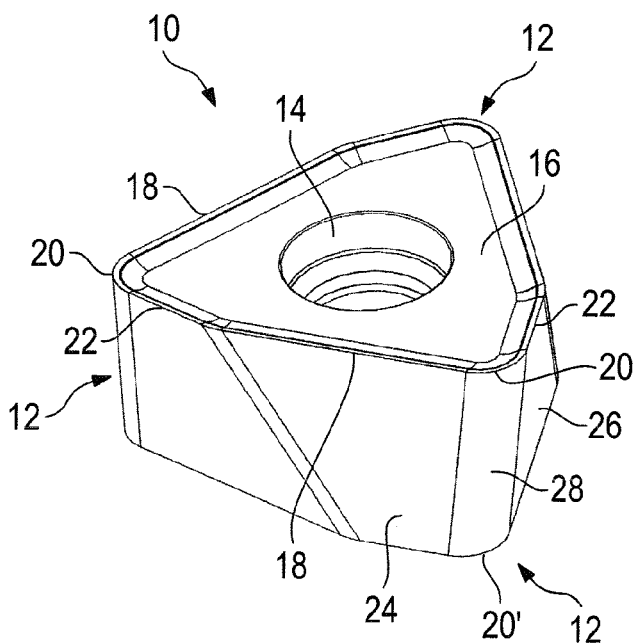
FIG. 1 shows a perspective view of an indexable cutting insert known from the prior art.
Figure 2:
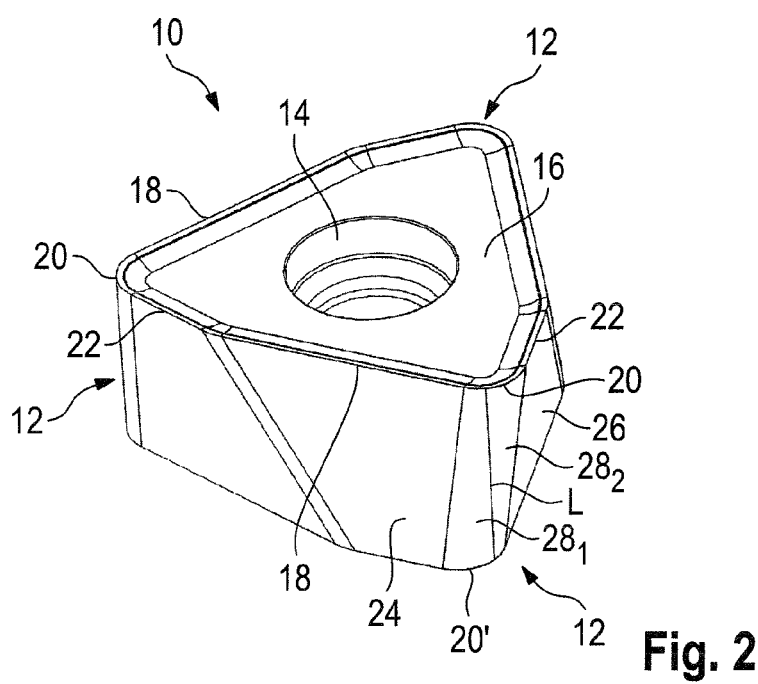
FIG. 2 shows a perspective view of an indexable cutting insert according to the invention.
Figure 3:
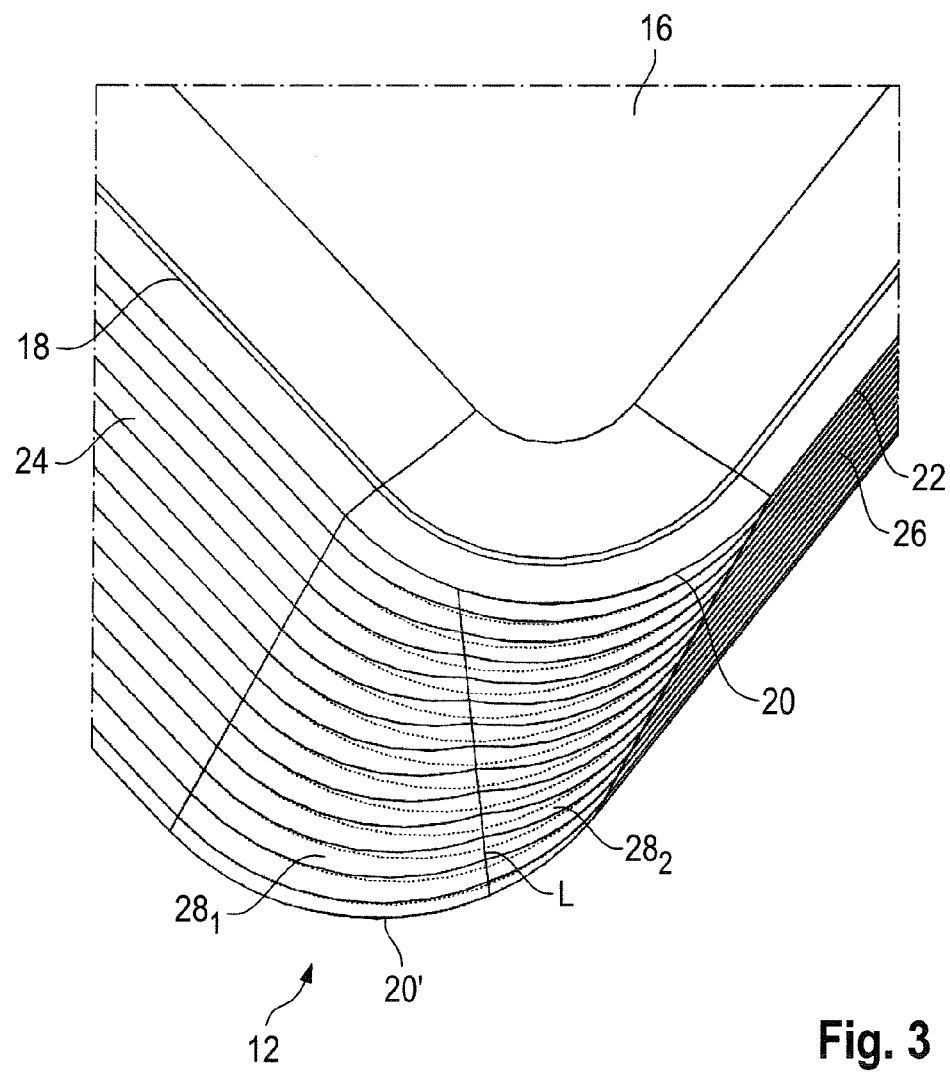
FIG. 3 shows a cutting corner of the indexable cutting insert according to the invention on an enlarged scale.

FIGS. 2 and 3 show the indexable cutting insert according to the invention. For the features known from FIG. 1, the same reference numerals have been used, such that in this respect, reference is made to the explanations above.

The indexable cutting insert 10 is composed of a sintered material which was pressed in a press tool before the sintering process.

The difference between the known indexable cutting insert and the indexable cutting insert according to the invention consists in that, instead of a continuous corner surface 28, a corner surface is now used which is composed of two partial surfaces $28_1$ and $28_2$. These meet along a line L which runs parallel to the longitudinal axis of the passage opening 14 and which furthermore intersects the two curved cutting edges 20, 20' of a cutting corner 12. Since the two curved cutting edges 20, 20' are offset with respect to one another in the circumferential direction, the line L extends "obliquely" with respect to the cutting corner, such that, as viewed in FIG. 3, said line intersects the cutting edge 20 to the left of the apex and intersects the cutting edge 20' to the right of the apex. As a result, the corner surface is drawn inward in the region between the two cutting edges 20, 20' in relation to the continuously curved corner surface 28 of the indexable cutting insert from FIG. 1.

The profile of the corner surface formed from the two partial surfaces $28_1$, $28_2$ can be understood using the following thought experiment based on a geometric structure simplified in relation to the indexable cutting insert according to the invention: the starting point is a cylinder composed of a flexible material and with a certain height, constant diameter and two parallel end surfaces. If a straight body, for example the cutting edge of a blade, is placed onto the outer side of the cylinder slightly obliquely with respect to the central axis of the cylinder and is pushed inward until it rests exactly on the outer circumference of the two end surfaces, the cutting edge pushes the lateral surface of the cylinder inward in the region between the two end surfaces. Here, the greatest "pushing-in" occurs centrally between the two end surfaces, whereas in each case one circle is maintained exactly at the two end surfaces, and the lateral surface is continuous.

This can be seen from FIG. 3, in which, for illustration, a plurality of contour lines are plotted on the cutting corner 12. Said contour lines may be regarded theoretically as section planes which are perpendicular to the central axis of the passage opening 14. It can be seen that, on each of the contour lines, the outer contour of the corner surface deviates inward relative to the profile, shown here by dotted lines, from the prior art, specifically to a greater extent the greater the distance from the curved cutting edge 20 or 20'. The greatest inward deviation thus occurs at a level corresponding to half of the height of the indexable cutting insert. An obtuse angle is formed where the two partial surfaces $28_1$, $28_2$ meet along the line L (with the exception of the cutting edges, where the two partial surfaces $28_1$, $28_2$ merge continuously into one another).

As a result of the fact that the corner surface is, as a whole, drawn inward slightly, the outer contour of each partial surface $28_1$, $28_2$ has, as viewed in a section perpendicular to the central axis of the passage opening 14, a radius of curvature smaller than the radius of curvature of the curved cutting edge 20, 20'.

The partial surfaces $28_1$, $28_2$ merge continuously, however, into the two flanks 24, 26. In other words, the flank forms a tangent to the corresponding side of the partial surface $28_1$ or $28_2$ respectively.

Figure 4:
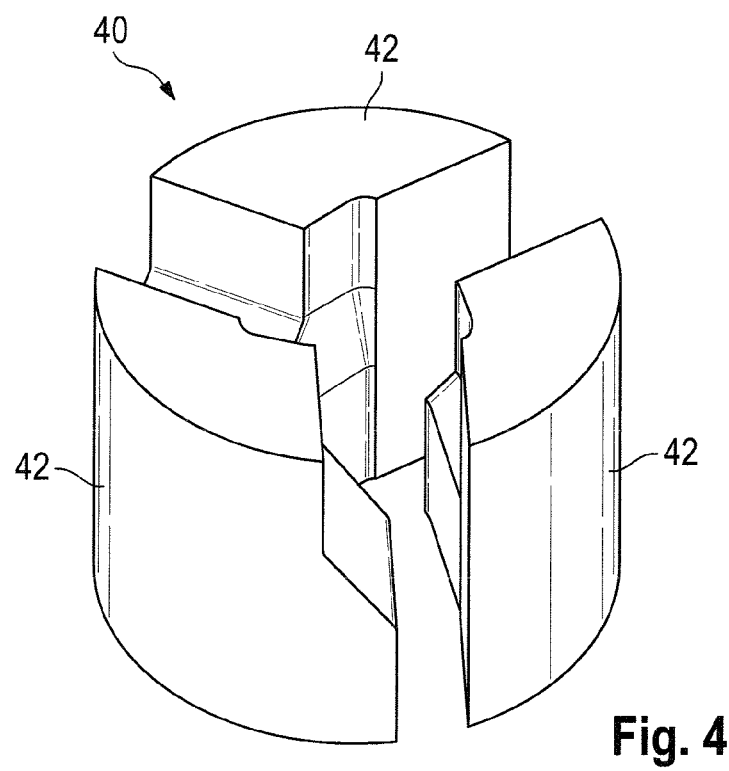
FIG. 4 schematically shows a press tool by means of which a main body of the indexable cutting insert according to the invention can be pressed.
Figure 5:
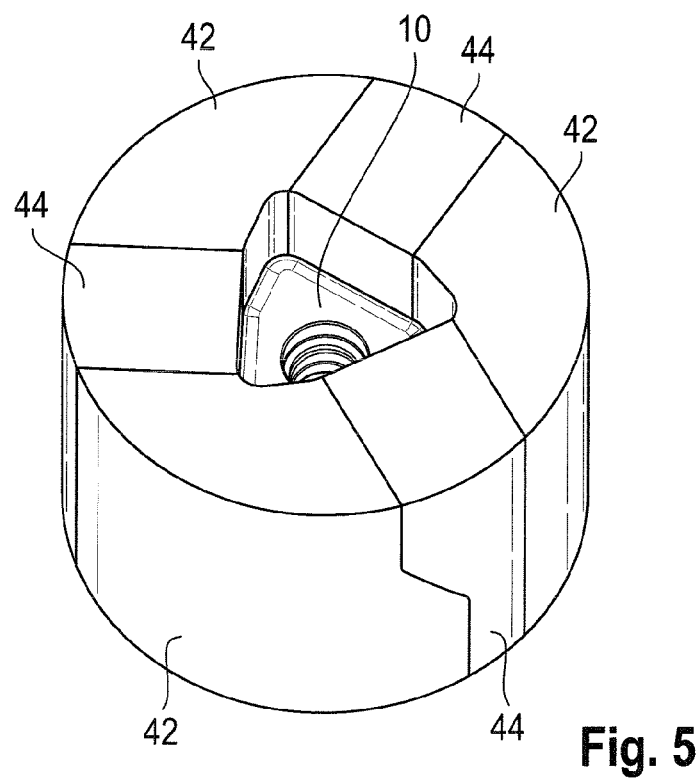
FIG. 5 schematically shows the press tool of FIG. 4 with slides inserted.

Said geometry of the corner surface 28 makes it possible for the main body of the indexable cutting insert to be pressed in a press tool as shown in FIGS. 4 and 5. The press tool 40 is composed of three fixed tool parts 42, between which a total of three slides 44 can be inserted. A press punch which acts from above is not illustrated here. In order to be able to remove the main body of the indexable cutting insert 10 from the mold after the pressing process even though the negative flanks 24 are present, the slides 44 can be retracted. Owing to the configuration according to the invention of the corner surface 28 which is composed of two partial surfaces $28_1$, $28_2$ which merge into one another along a line parallel to the central axis of the passage opening, even the cutting corners 12 can be removed from the mold without problems.

The described geometry of the cutting edges with the partial surfaces $28_1$, $28_2$ is not restricted to indexable cutting inserts with three cutting corners; it is basically also possible for more than three cutting corners to be provided.

What is claimed is:

1. An indexable cutting insert comprising two faces, a passage opening extending from one face to the other face, a plurality of cutting corners, each cutting corner having a continuously curved cutting edge, and a flank on each side of each cutting corner, wherein one flank has a positive clearance angle with respect to the central axis of the passage opening and the other flank has a negative clearance angle with respect to the central axis of the passage opening, wherein each cutting corner has two partial surfaces which adjoin one another along a line running parallel to the central axis of the passage opening.

2. The indexable cutting insert as claimed in claim 1, wherein an obtuse angle is formed where the two partial surfaces adjoin one another along the line running parallel to the central axis of the passage opening.

3. The indexable cutting insert as claimed in claim 1, wherein each partial surface merges into a respective flank.

4. The indexable cutting insert as claimed in claim 1, wherein each cutting corner has a radius of curvature with a maximum inward deviation corresponding to one-half a height of the cutting insert.

5. The indexable cutting insert as claimed in claim 1, wherein the line intersects the cutting edge at one face on one side of the apex of the cutting edge and intersects the cutting edge of the other face on the other side of the apex.

6. The indexable cutting insert as claimed in claim 1, wherein the cutting insert is composed of a sintered material.

\* \* \* \* \*

UNITED STATES PATENT AND TRADEMARK OFFICE
CERTIFICATE OF CORRECTION

PATENT NO. : 8,858,131 B2
APPLICATION NO. : 13/655547
DATED : October 14, 2014
INVENTOR(S) : Sebastian Scheicher It is certified that error appears in the above-identified patent and that said Letters Patent is hereby corrected as shown below:

IN THE SPECIFICATION
In Column 1, Line 15, delete "plan view" and insert -- plane view --, therefor.
In Column 1, Line 18, delete "plan view," and insert -- plane view, --, therefor.

Signed and Sealed this
Twenty-first Day of April, 2015

Michelle K. Lee
*Director of the United States Patent and Trademark Office*